United States Patent [19]
Uhlman

[11] Patent Number: 5,060,411
[45] Date of Patent: Oct. 29, 1991

[54] GAME LURING SCENT DISPENSING KIT

[76] Inventor: Jeffrey A. Uhlman, 314 Church St., Northboro, Mass. 01532

[21] Appl. No.: 597,516

[22] Filed: Oct. 15, 1990

[51] Int. Cl.⁵ .......................................... A01M 31/00
[52] U.S. Cl. ....................................................... 43/1
[58] Field of Search .................... 43/1, 2, 131, 124; 47/81; 222/181, 187

[56] References Cited

U.S. PATENT DOCUMENTS

| | | | |
|---|---|---|---|
| 3,679,133 | 7/1972 | Sekiguchi et al. | 222/187 |
| 3,941,283 | 3/1976 | Garbe | 222/187 |
| 4,085,866 | 4/1978 | Fekl | 222/181 |
| 4,506,806 | 3/1985 | Lincoln | 222/175 |
| 4,553,966 | 11/1985 | Kortenweg | 222/187 |
| 4,682,715 | 7/1987 | Reeves | 222/175 |
| 4,773,177 | 9/1988 | Gray II. et al. | 43/1 |

OTHER PUBLICATIONS

"Popular Mechanics", Jun. 1939, p. 946.

Primary Examiner—Richard K. Seidel
Assistant Examiner—Chuck Y. Mah
Attorney, Agent, or Firm—Leon Gilden

[57] ABSTRACT

A flexible containment harness receives a fluid dispensing container therewithin, wherein the fluid dispensing container includes a quantity of gam attracting fluid therewithin. The container includes a lowermost dispensing nozzle directed through an opening within the harness, and wherein the harness includes an overlying strap for securement to tree limbs and the like for suspension thereof. The kit assembly further includes a funnel member securable overlying the dispensing tip, wherein the funnel member includes a wick to provide enhanced surface area for the directing of the scent. Further, a sponge spherical member amy be secured to the nozzle as an alternative manner of directing the fluid in a surrounding forum.

5 Claims, 5 Drawing Sheets

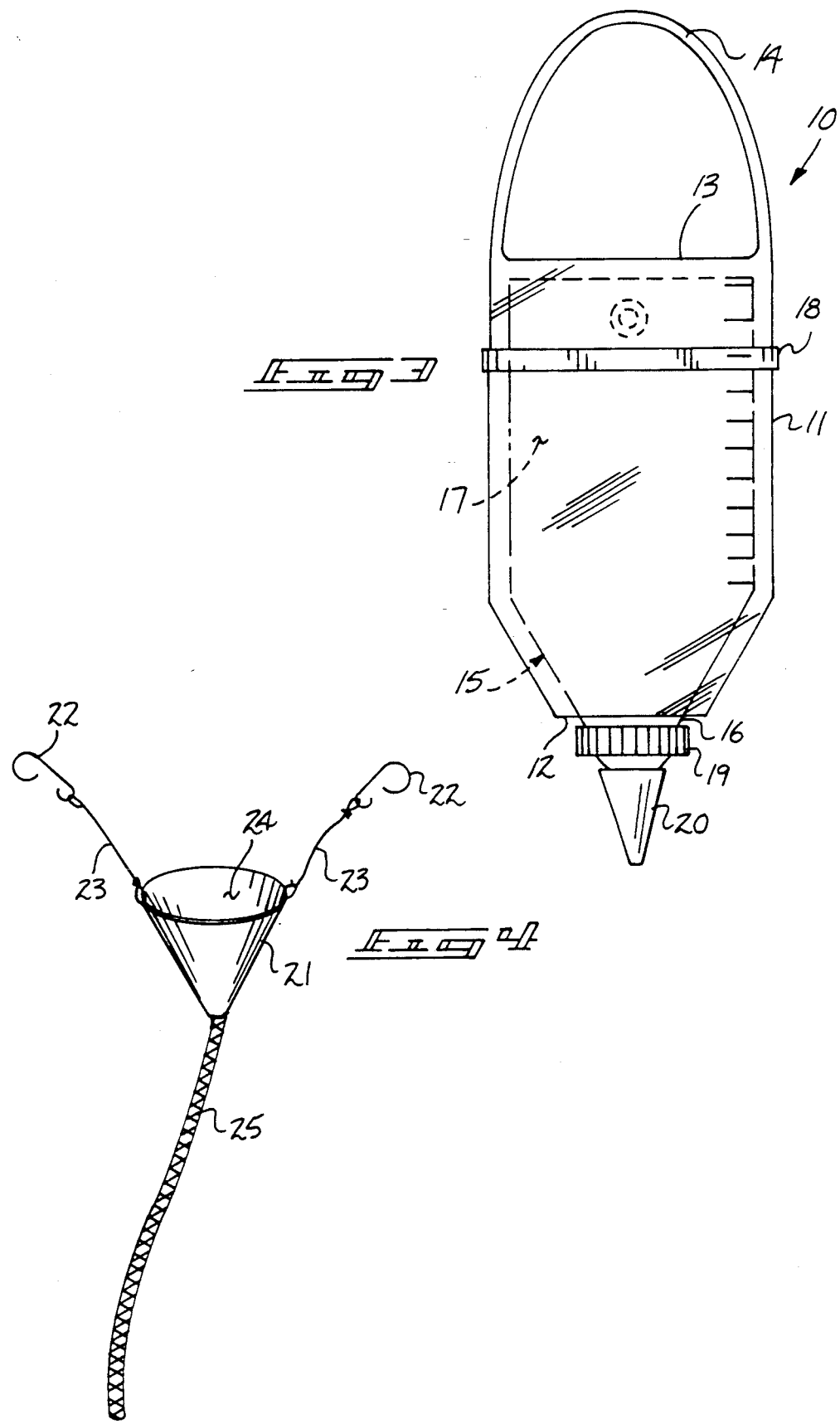

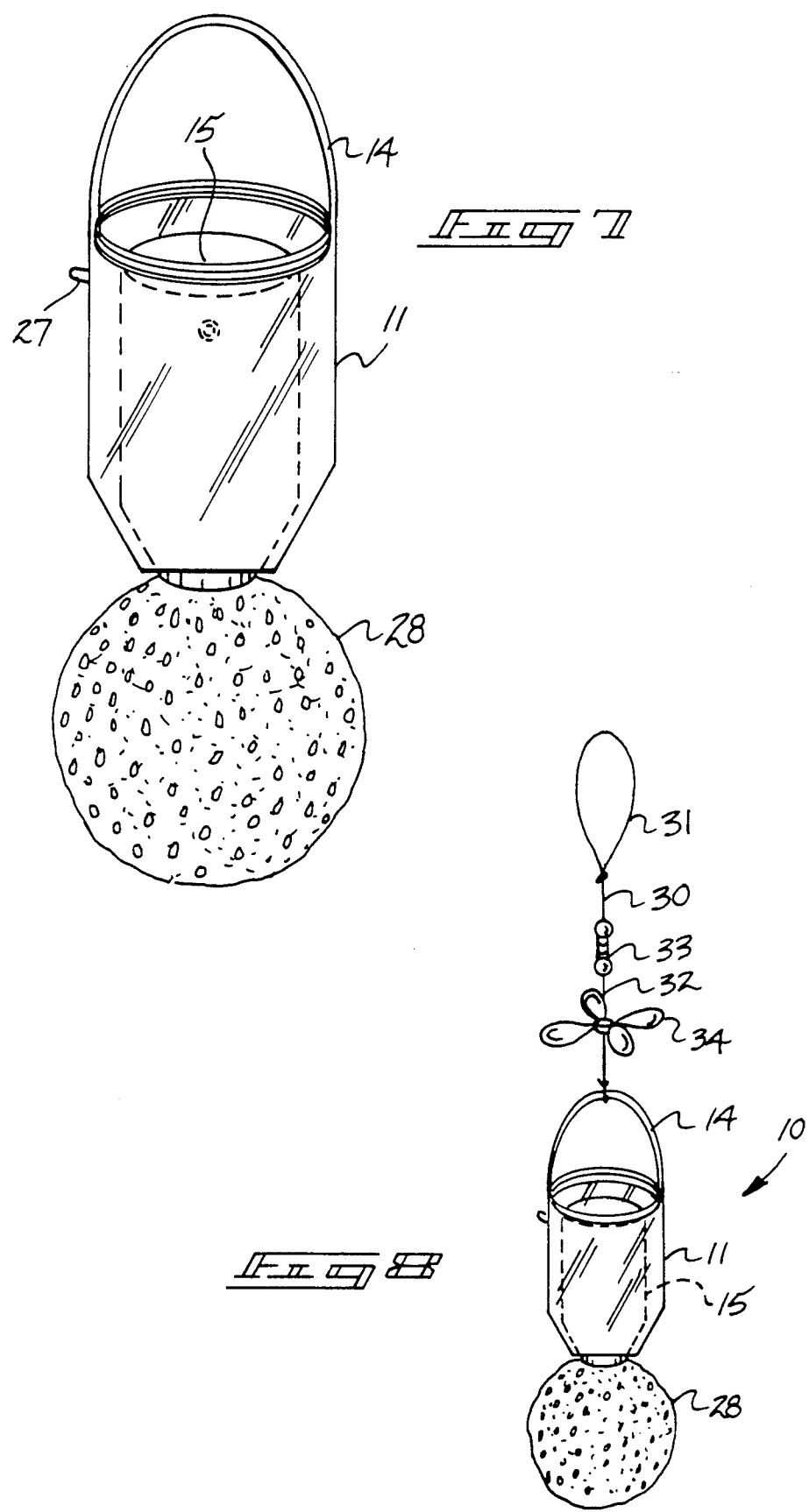

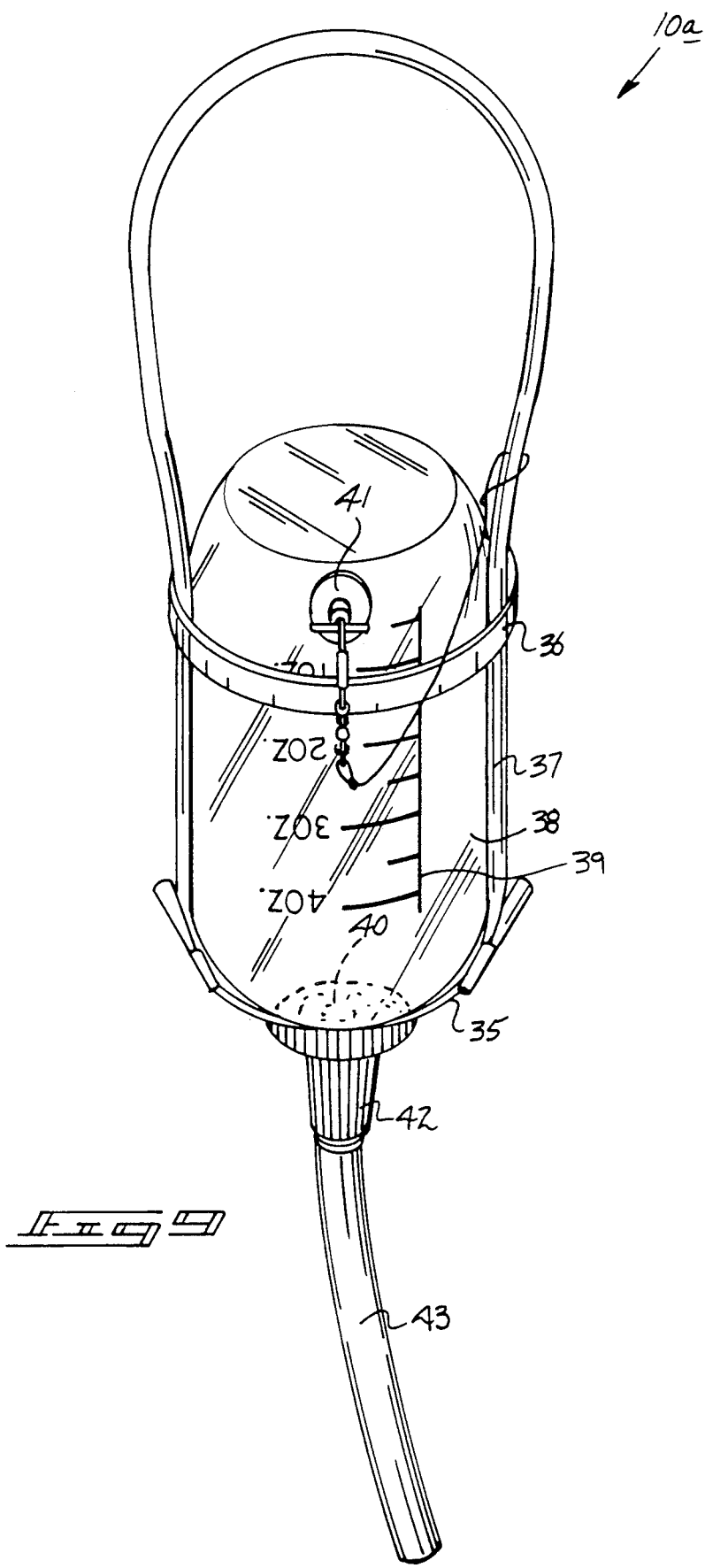

GAME LURING SCENT DISPENSING KIT

BACKGROUND OF THE INVENTION

1. Field of the Invention

The field of invention relates to game animal luring devices, and more particularly pertains to a new and improved game luring scent dispensing kit for selective securement to overlying supports, such as tree limbs and the like, for attracting game animals thereto.

2. Description of the Prior Art

The use of game attracting scented devices has been directed in the prior art for the luring of various game animals and the like for access to individual hunters and sportsmen. The instant invention attempts to overcome deficiencies of the prior art by providing a game scent dispensing organization that is positionable in an elevated position above typical game animal trails to enhance dispersion of the scent in use. Examples of the prior art include U.S. Pat. No. 4,771,563 to Easley wherein a heated container directs a scent to emanate from within the container for dispersion about an area.

U.S. Pat. No. 3,046,192 to Bilyeau sets forth a bag to be suspended by a tether line to permit directing of an aromatic scent therefrom for attracting of game animals.

U.S. Pat. No. 4,302,899 to Dehart provides a pad securable within a housing that is in turn attachable to a garment of a sportsman's clothing for attracting animals.

U.S. Pat. No. 4,186,502 to Foster utilizes a scent dispensing means positionable within a show for directing of the scent in a surrounding region.

As such, it may be appreciated that there continues to be a need for a new and improved game luring scent dispensing kit wherein the same addresses both the problems of ease of use, as well as effectiveness in application in directing of a game attracting scent and in this respect, the present invention substantially fulfills this need.

SUMMARY OF THE INVENTION

In view of the foregoing disadvantages inherent in the known types of game luring devices now present in the prior art, the present invention provides a scrape maker and game luring scent dispensing kit wherein the same is suspendable from an overlying support for selective dispensing of an aromatic game attracting fluid within the area. As such, the general purpose of the present invention, which will be described subsequently in greater detail, is to provide a new and improved scrape maker and game luring scent dispensing kit which has all the advantages of the prior art game luring devices and none of the disadvantages.

To attain this, the present invention includes a flexible containment harness receiving a fluid dispensing container therewithin, wherein the fluid dispensing container includes a quantity of game attracting fluid therewithin. The container includes a lowermost dispensing nozzle directed through an opening within the harness, and wherein the harness includes an overlying strap for securement to tree limbs and the like for suspension thereof. The kit assembly further includes a funnel member securable overlying the dispensing tip, wherein the funnel member includes a wick to provide enhanced surface area for the directing of the scent. Further, a sponge spherical member may be secured to the nozzle as an alternative manner of directing the fluid in a surrounding forum. A suspension tether may optionally be utilized, with the tether including an impeller to effect rotation of the harness and associated container for enhancing dispersion of the scented fluid in surrounding areas for attracting of game animals and the like thereto.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved scrape maker and game luring scent dispensing kit which has all the advantages of the prior art game luring devices and none of the disadvantages.

It is another object of the present invention to provide a new and improved scrape maker and game luring scent dispensing kit which may be easily and efficiently manufactured and marketed.

It is a further object of the present invention to provide a new and improved scrape maker and game luring scent dispensing kit which is of a durable and reliable construction.

An even further object of the present invention is to provide a new and improved scrape maker and game luring scent dispensing kit which is susceptible of a low cost of manufacture with regard to both materials and labor, and which accordingly is then susceptible of low prices of sale to the consuming public, thereby making such scrape maker and game luring scent dispensing kits economically available to the buying public.

Still yet another object of the present invention is to provide a new and improved scrape maker and game luring scent dispensing kit which provides in the apparatuses and methods of the prior art some of the advantages thereof, while simultaneously overcoming some of the disadvantages normally associated therewith.

Still another object of the present invention is to provide a new and improved scrape make and game luring scent dispensing kit wherein the same is readily transported for use and conveniently and efficiently securable to an overlying support for dispensing of a game attracting aromatic fluid.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view, taken in elevation, of the instant invention.

FIG. 4 is an isometric illustration of a funnel and wick structure utilized by the instant invention.

FIG. 7 is an isometric illustration of the sponge of FIG. 6 in association with the dispensing organization.

FIG. 8 is an isometric illustration of the instant invention utilizing an impeller to effect rotation of the container and dispensing sponge to enhance distribution of the scent in a surrounding forum.

FIG. 9 is an isometric illustration of a modified harness and container organization of the instant invention.

DESCRIPTION OF THE PREFERRED EMBODIMENT

Figure 1:
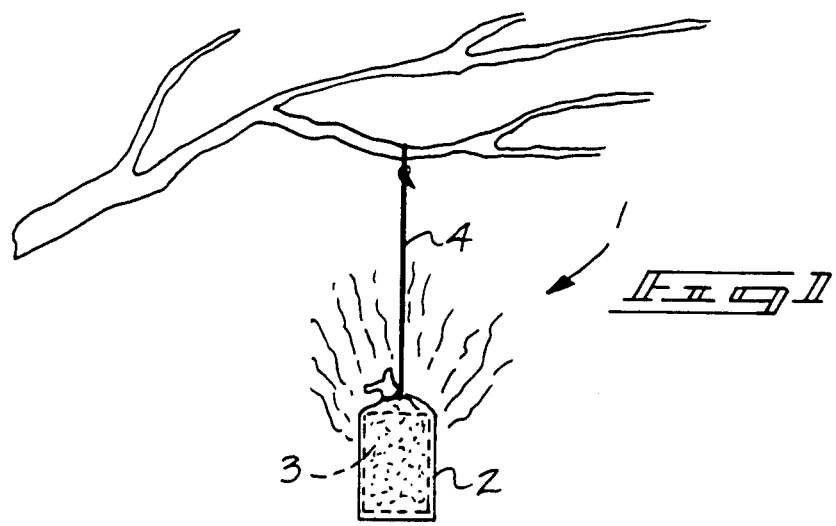
FIG. 1 is an orthographic view of a prior art game dispensing organization.

With reference now to the drawings, and in particular to FIGS. 1 to 9 thereof, a new and improved scrape maker and game luring scent dispensing kit embodying the principles and concepts of the present invention and generally designated by the reference numeral 10 and 10a will be described.

Figure 2:
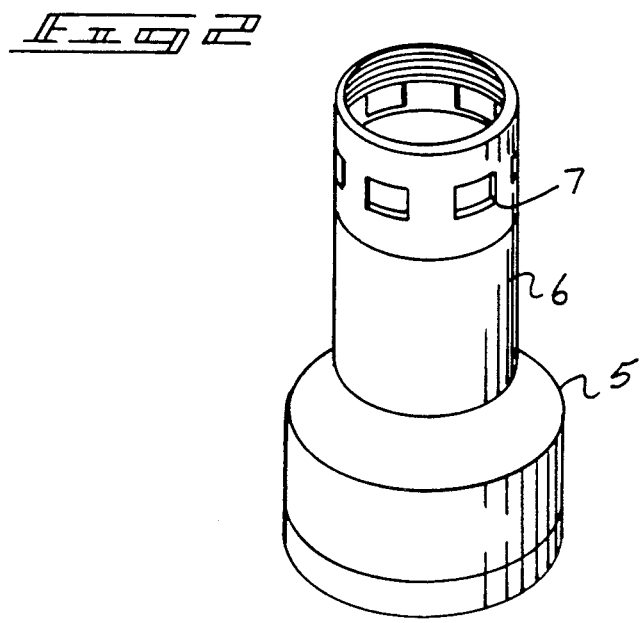
FIG. 2 is an isometric illustration of a further game luring dispensing apparatus.

FIG. 1 illustrates a prior art dispensing organization 1 wherein a chamber 2 mounts a scent directing member therewithin to direct scent through the chamber into a surrounding area utilizing a suspension line 4 for securing the organization to an overlying tree limb, as illustrated. FIG. 2 illustrates the use of a housing 5 of a further prior art device formed with an upper chamber 6, wherein the housing 5 includes a heating element to directing scent from the chamber 6 through vents 7 into a surrounding area.

More specifically, the game luring scent dispensing kit 10 of the instant invention essentially comprises an elongate flexible, polymeric containment harness 11 defining an open chamber therewithin, including an open lower end 12 of a first diameter, with a coaxially aligned open top end 13 of a second diameter greater than the first diameter, with a harness strap 14 orthogonally mounted to diametrically opposed portions of the open top end. An inverted dispensing container 15 is received within the chamber defined by the harness 11, wherein the container includes a narrow neck 16 directed through the open lower end 12, with an enlarged container body 17 directed through the open top end for securement within the harness. An elastomeric securement band 18 assists in securement and positioning of the container 17 within the harness, as illustrated. Further, the container 15 includes a cap 19, with a conical dispensing top 20 coaxially aligned with the container and directed downwardly thereof to dispense fluid scent through the tip into a surrounding area for attracting of various game animals.

FIG. 4 illustrates the kit utilizing a funnel 21. The funnel 21 includes diametrically spaced securement hooks 22 mounted to flexible lines 23, that in turn are mounted to diametrically opposed portions of an upper end of the funnel defined by a funnel cavity 24. The funnel cavity 24 is of a generally conical configuration complementary to that defined by the tip 20 to receive the tip 20 therewithin and to direct fluid from the tip 20 through the lowermost exit end of the funnel 21 to an elongate porous wick 25 that is mounted in fluid communication with the exit end of the funnel 21. The elongate, flexible wick 25 enhances dispersion of scent from within the container in a surrounding area.

Figure 5:
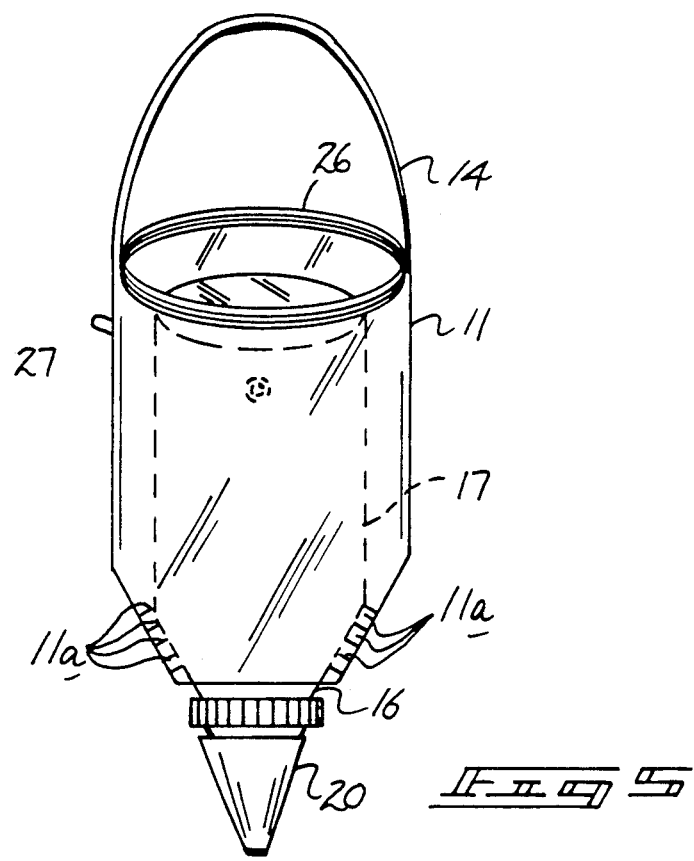
FIG. 5 is an isometric illustration of the instant invention utilizing an interlocking uppermost end to seal the container within the associated harness.

FIG. 5 illustrates the containment harness 11, including an interlocking perimeter 26 defining the open top end of the container, with a vent tube 27 directed into the chamber defined by the harness 11 to ensure dispensing of fluid from the associated container and body 17 through the conical dispensing tip 20. Further, spaced projections 11a within the neck of the harness 11, cooperate with the container to space the container from the neck of the harness to permit fluid drainage therefrom in the event of fluid accumulation from rain, snow, and the like within the harness.

Figure 6:
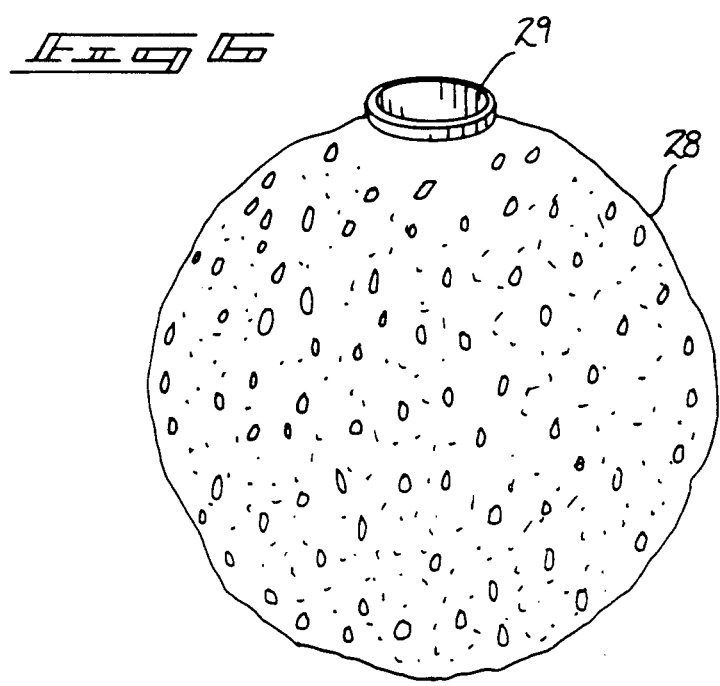
FIG. 6 is an isometric illustration of a scent dispensing sponge utilized by the instant invention.

FIG. 6 illustrates the use of a spherical sponge 28. The spherical sponge 28 includes a conical sponge cavity 29 radially directed interiorly of the sponge 28 and defining an interior conical cavity complementary to the tip 20 to securedly mount the tip 20 within the cavity by use of adhesives and the like.

FIG. 7 illustrates the association of the sponge 28 associated with the spherical tip.

FIG. 8 illustrates the kit further utilizing an upper securement line 30 mounted to a lower securement line 32 by use of a swivel connection 33. The upper securement line 30 includes an upper loop 31 for securement of the organization to a tree limb and the like for suspension of the organization 10. The lower securement line 32 is secured to the strap 14 medially thereof, with an impeller member 34 fixedly mounted to the lower securement line 32, wherein prevailing wind and air currents effect rotation of the impeller 34 and associated harness 11 to enhance distribution of the scented fluid contained within the dispensing container 15.

FIG. 9 is an isometric illustration of a modified harness of the instant invention utilizing a bottom yoke 35 spaced from and parallel to a top yoke 36, with a strap 37 interconnecting the top and bottom yoke and mounted orthogonally thereto, wherein the strap defines an upper loop extending above and beyond the upper yoke 36 for supported suspension of the organization by the strap. The container 38 includes graduations to enhance ease of use and visual inspection of remaining fluid within the organization that includes a porous filter 40 to prevent sediment from clogging the downwardly oriented tip 42 of the container. The filter 40 may be formed of any desirable porous material, such as cotton and the like, permitting filtration of the fluid within the container and not subject to degeneration by interaction of such fluid. A nozzle includes a conduit tube 43 to direct fluid in a predetermined orientation and the conduit 43 is of a flexible malleable material to permit orientation of fluid directed through the nozzle. A threadedly mounted plug 41 positioned adjacent an upper terminal end of the container 38 is mounted through the container 38 through an upper end of the side wall thereof to effect pressurizing of fluid within the container and enhance drainage of the fluid upon removal of the plug 41.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A game luring scent dispensing kit comprising, in combination,
    an elongate, flexible containment harness including an open lower end defined by a first diameter, and an opened top end defined by a second diameter, wherein the second diameter is greater than said first diameter, and
    a dispensing container mounted within the harness, including dispensing tip directed through the open lower end of the harness, wherein the dispensing container includes a game attracting fluid contained therewithin, and
    wherein the harness includes a harness strap, the harness strap orthogonally mounted at diametrically opposed portions of the open top end of the harness for suspending the harness from an overlying support, and
    therein the container includes a narrow neck coaxially mounted to an elongate body, the narrow neck mounting a cap, the cap including the dispensing tip mounted thereon, the dispensing tip of a conical configuration, and
    including a funnel member, the funnel member including a funnel cavity defined by a cavity configuration complementary to the dispensing tip, and the funnel member including diametrically secured flexible lines mounted to opposed ends of an upper end of the funnel, the flexible lines further including securement hooks mounted at free terminal ends of each flexible line for securement of the funnel member to the harness, and an elongate, porous wick mounted to an exit lower end of the funnel in fluid communication therewith, the porous wick defined by a flexible construction to enhance distribution of the fluid contained within the container.

2. An apparatus as set forth in claim 1 wherein the kit further includes a spherical sponge member, the spherical sponge member including a conical sponge cavity defined by a cavity configuration complementary to the conical tip to permit securement of the sponge cavity to the conical tip, and wherein the conical sponge cavity is radially directed interiorly of the spherical sponge.

3. An apparatus as set forth in claim 2 further including a first flexible line, the first flexible line including a loop at an upper end thereof, and a second flexible line secured to the first flexible line, and a swivel connection rotatably mounting the first flexible line to the second flexible line, and a lower terminal end of the second flexible line secured medially to the strap, and an impeller fixedly mounted to the second flexible line to effect rotation of the harness upon rotation of the impeller.

4. An apparatus as set forth in claim 3 wherein the container includes a porous filter mounted within the container spaced above the dispensing tip to effect filtration of sediment within the container preventing clogging of the dispensing tip.

5. An apparatus as set forth in claim 4 wherein the container further includes a plug member removably mounted within a side wall container adjacent an upper end thereof to enhance equalization of pressure within the container during dispensing of fluid therefrom.

* * * * *